United States Patent [19]
Holzhauer et al.

[11] 3,801,216
[45] Apr. 2, 1974

[54] INSTALLATION FOR ADJUSTING POWER TURBINE GUIDE BLADES IN TWIN-SHAFT GAS TURBINE ENGINES, ESPECIALLY FOR THE DRIVE OF MOTOR VEHICLES

[75] Inventors: Hilbert Holzhauer; Alois Rohra, both of Munich, Germany

[73] Assignee: Motoren-Und Turbinen-Union Munchen GmbH, Munchen, Germany

[22] Filed: Aug. 13, 1971

[21] Appl. No.: 171,631

[30] Foreign Application Priority Data
Aug. 19, 1970 Germany.............................. 2041109

[52] U.S. Cl. ................................ 415/151, 415/160
[51] Int. Cl. ....................... F01d 17/00, F01d 17/08
[58] Field of Search ........... 415/159, 160, 149, 150, 415/151

[56] References Cited
UNITED STATES PATENTS

| | | | |
|---|---|---|---|
| 3,362,624 | 1/1968 | Endress............................. | 415/150 |
| 803,041 | 10/1905 | Wilkinson........................... | 415/150 |
| 2,037,395 | 4/1936 | Seelig................................ | 415/160 |
| 2,994,509 | 8/1961 | Walker............................... | 415/159 |
| 3,574,479 | 4/1971 | Barnard............................. | 415/160 |

*Primary Examiner*—Henry F. Raduazo
*Attorney, Agent, or Firm*—Craig and Antonelli

[57] ABSTRACT

An installation for adjusting the guide blades of a power turbine in twin-shaft gas turbine engines, which serve in particular for the drive of motor vehicles, whereby the movement of an adjusting piston is adapted to be transmitted to a rotatable ring gear which adjusts the guide blades by way of bevel gears; a lever system thereby forms the transmission means for the nonlinear translation of the movements of the adjusting piston into angular movement of the adjustable guide blades within the operation range from "drive" to "braking.".

17 Claims, 3 Drawing Figures

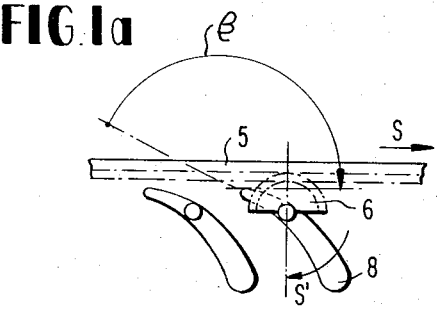
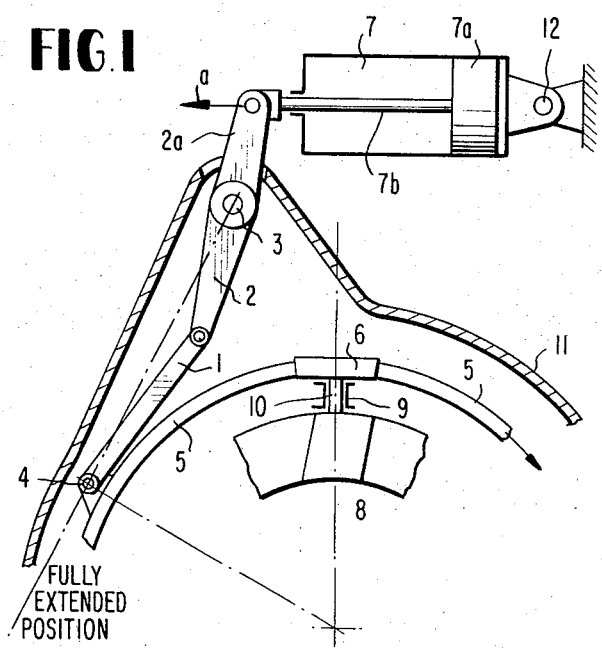
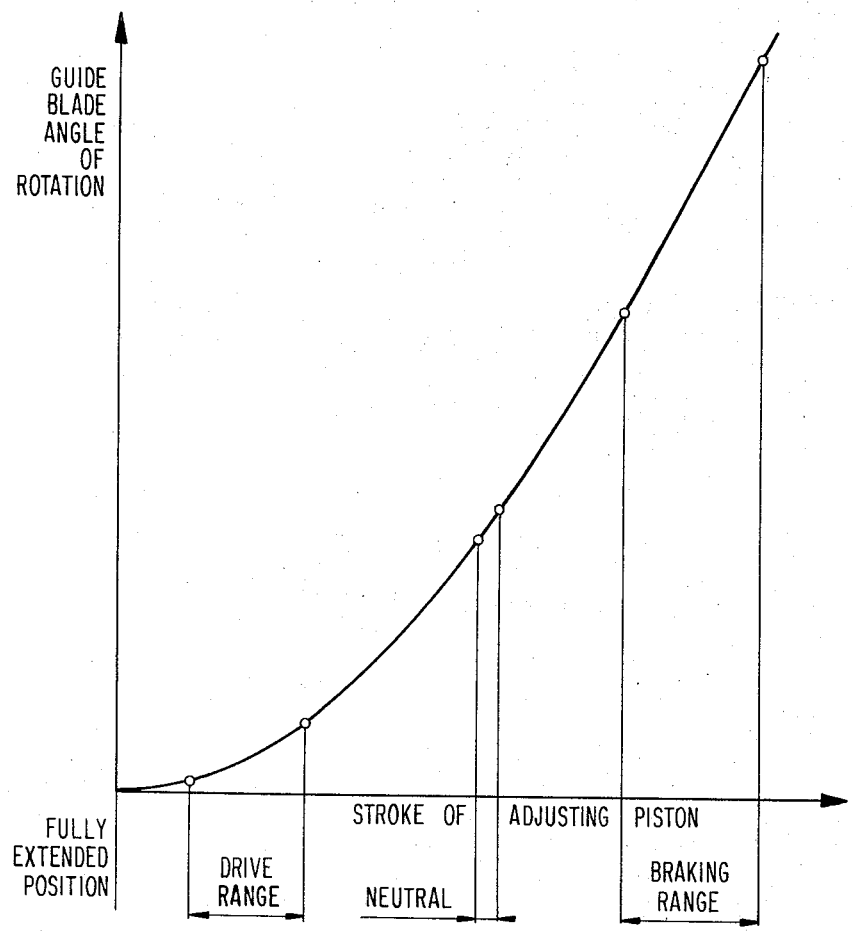

INSTALLATION FOR ADJUSTING POWER TURBINE GUIDE BLADES IN TWIN-SHAFT GAS TURBINE ENGINES, ESPECIALLY FOR THE DRIVE OF MOTOR VEHICLES

This invention relates to an installation for adjusting power turbine guide blades in twin-shaft gas turbine engines, which serve in particular for the drive of motor vehicles, in which the motion of an adjusting piston is adapted to be transmitted to a rotatably mounted ring gear, by means of which the power turbine guide blades are adjustable by way of bevel gears.

A gas turbine engine has to operate at optimum efficiency also at less than full load, i.e., in the partial load range. In order to achieve this, it is necessary that the compressor turbine inlet temperature thereof remains constant also when the gas throughput is reduced. To achieve this, the throat areas through the cascade of the adjustable blades must be varied, which is accomplished by jointly rotating the power turbine guide blades. The signal to rotate is initiated by a control device, such as a governor, primarily controlled by the parameter of "compressor turbine inlet temperature."

In the "drive region" of the gas turbine operation, which ranges from full load to the lowest practicable partial load, the smallest rotation of the power turbine blades brought about by the control device produces a significant change in compressor turbine inlet temperature.

A single-lever connection between the actuator and the ring gear that positions the guide blades, would call for actuator movements as close as approximately 0.05 mm if the gas temperature is to be held within ±5° C. This high degree of accuracy can be implemented only by intricate and commensurately costly engineering efforts.

Apart from the requirement for a high degree of actuating accuracy in the "drive region" of turbine operation, provision must be made to rotate the adjustable blades as rapidly as possible through a wide sweep or angular range of approximately 120° during the shifting up of the vehicle transmission, so that the flow impinging on the power turbine blades may be reversed to decelerate and thus brake the same.

The rapidity of this operation bears a direct relation to the duration of the shifting operation and, hence, to the interruption of traction.

A rapid motion of the adjustable blades is similarly necessary during an acceleration operation to unthrottle the gas generator for acceleration.

The blade adjusting system known heretofore has been unable to simultaneously satisfy both of these two distinct requirements, namely, a high actuating accuracy in the "drive region" and a rapid adjustment in the "neutral or the decelerating region."

Consequently, it is the object of this invention to provide or adjusting mechanism for adjusting the power turbine guide blades in a twin-shaft gas turbine engine without high expenditures as regards the control, which is characterized by great actuating accuracy in the "drive region" and by a rapid adjustment into the "neutral region" (acceleration) or into the "braking region" (shifting of vehicle transmission or braking of the vehicle by means of the power turbine).

As solution to the underlying problems, it is proposed according to the present invention to provide an apparatus in which a compound lever system represents the transmission means for producing a nonlinear translation of the movement of the adjusting piston or adjusting motor into an angular motion of the adjustable turbine guide blades throughout the operating range from drive to braking.

A further feature of this invention resides in that the lever system consists of a pair of levers whose variably extended relative position between the fulcrum and the point of pivotal connection is so selected that the resulting motion of the point pivotal connection corresponds to the nonlinear transmission requirement of the adjustable turbine guide blades.

It is further proposed according to this invention that in the operating condition drive, the pair of levers is disposed near their fully extended, straight-line position, in which the translation of the point of pivotal connection relative to the adjusting piston movement (stroke) is large.

A further feature of this invention resides in that, in the operating condition braking, the pair of levers is deflected farthest away from the fully extended, straight-line position, whereby in this condition the translation of the point of pivotal connection relative to the adjusting piston movement is small.

According to a further development of this invention, it is proposed that the actuating lever engages at the point of pivotal connection tangentially with the ring gear so as to eliminate transverse forces.

The present invention advantageously fulfills all requirements mentioned hereinabove. Even though the variable guide blades of the power turbine admit of rapid rotation through the entire angle of sweep, they equally permit of a high degree of actuating accuracy in the drive region.

These and other objects, features and advantages of the present invention will become more apparent from the following description when taken in conjunction with the accompanying drawing which shows, for purposes of illustration only, one embodiment in accordance with the present invention, and wherein:

FIG. 1 an elevational view of the adjusting installation of this invention;

FIG. 1a is a partial plan view of the adjusting installation of FIG. 1, and

FIG. 2 is a graph illustrating the angle of guide blade rotation versus actuating piston travel.

Referring now to the drawing wherein like reference numerals are used throughout the two views thereof to designate like parts, FIG. 1 shows a pair of levers consisting of lever 1 and lever 2. The lever 2 which is connected with the adjusting lever 2a, rotates about fulcrum 3. The actuating piston 7a in cylinder 7 which is horizontally supported in pivot joint 12, is operatively connected with the adjusting lever 2a by way of the piston rod 7b so that a movement of the actuating piston 7a causes levers 2 and 2a to pivot about the fulcrum 3. The lever 1 which is pivotally connected with the lever 2, engages at its other end at the point of pivotal connection 4 tangentially with ring gear 5 which rotates the turbine guide blades 8 by way of bevel gears 6. The fully extended, straight-line position of the pair of levers 1, 2 is indiacted in dot and dash lines. The bearing 9 for the shaft 10 which transmits the angular motion to the guide blades is provided in the annular space between the ring gear 5 and the guide blade ring.

As can be readily seen from the drawing the direction of movement $a$ of the actuating piston 7a corresponds to a direction of movements s of the ring gear 5, both movements being indicated by arrows. The reference numeral 11 designates the housing enclosing the adjusting mechanism.

FIG. 1a shows ring gear 5 engaging with bevel gear 6. The rotation of the ring gear 5 in the direction s is transmitted by way of the bevel gear 6 to the guide blade 8 to produce a rotation of the blade in the direction s' as indicated by the arrow. FIG. 1a further illustrates that exit angle $\beta$ of guide blade 8 is the design angle at full operating load, when the pair of levers 1, 2 is disposed near the fully extended, straight-line position thereof, i.e., in the fine control range.

FIG. 2 shows the relationship of the angle $\beta$ of the guide blade rotation as a function of the travel or stroke of the actuating piston 7a. The functional interrelationship provided by the adjusting mechanism of this invention approximately follows a parabola in which the main axis is the ordinate. It can be clearly seen that in the drive region of the turbine a very minor change in actuating piston travel will enable a closely accurate adjustment of the angle of rotation of the guide blade about its axis. Owing to the progressive configuration of the curve the further operating conditions of the turbine, i.e., the neutral (accelerating) and braking and braking (decelerating) regions, can be reached with small piston movements and, accordingly, with great rapidity.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for adjusting the power turbine guide blades in a gas turbine engine, which serves in particular for the drive of motor vehicles, in which the movement of an actuating piston means is adapted to be transmitted to a rotatably mounted ring gear, and in which the turbine guide blades are adjustable by the ring gear by way of bevel gears, characterized by a lever means consituting a transmission means for producing nonlinear leverage between the movement of the actuating piston means and the angular motion of the adjustable turbine guide blades in the operating range from drive to braking, characterized in that the lever means includes a pair of levers which by their more or less extended relative position between a fulcrum thereof and a point of pivotal connection with the ring gear impart a motion to the point of pivotal connection that provides the required nonlinear leverage of the adjustable guide blades, characterized in that the pair of levers are disposed near their fully extended straight-line position in the operating condition drive, in which the lever advantage of the point of pivotal connection with respect to the movement of the adjusting piston means is large, and characterized in that the pair of levers are deflected farthest away from the fully extended position in the operating condition braking in which the lever advantage of the point of pivotal connection with respect to the movement of the adjusting piston means is small.

2. An installation according to claim 1, characterized in that the actuating lever engages with the ring gear at the point of pivotal connection substantially tangentially with respect thereto so as to eliminate transverse forces.

3. An adjusting arrangement for adjusting guide vanes on a gas turbine engine of the type having radially extending guide vanes arranged upstream of an engine turbine means, said engine being operable in a drive condition and braking and neutral conditions; said adjusting arrangement comprising:

mounting means for mounting guide vanes for rotation about respective radially extending guide vane axes, linearly movable actuating piston means, moving means for moving said actuating piston means, and transmission means separate from said moving means for transmitting linear movement of said piston means into rotatable movement of said guide vanes about said respective vane axes, wherein said transmission means includes means for nonlinearly transmitting movement of said piston means into movement of said guide vanes with said guide vanes being rotated by a greater amount in response to a predetermined linear movement of said piston means when said engine is in said braking and neutral conditions than the amount said guide vanes are rotated in response to a similar predetermined linear movement of said piston means when said engine is in said drive condition, whereby the accuracy of guide vane adjustment in the drive condition and the rapidity of guide vane adjustment in the braking and neutral conditions are optimized.

4. An arrangement according to claim 3, wherein said drive condition of said engine ranges from full load to the lowest practicable partial load on said engine.

5. An adjusting arrangement for adjusting guide vanes on a gas turbine engine of the type having radially extending guide vanes arranged upstream of an engine turbine means, said engine being operable in a drive condition and braking and neutral conditions; said adjusting arrangement comprising:

mounting means for mounting guide vanes for rotation about respective radially extending guide vane axes, linearly movable actuating piston means, means for moving said actuating piston means, and transmission means for transmitting linear movement of said piston means into rotatable movement of said guide vanes about said respective vane axes, wherein said transmission means includes means for nonlinearly transmitting movement of said piston means into movement of said guide vanes such that said guide vanes are rotated by a greater amount in response to a predetermined linear movement of said piston means when said engine is in said braking and neutral conditions than the amount said guide vanes are rotated in response to a similar predetermined linear movement of said piston means when said engine is in said drive condition, whereby the accuracy of guide vane adjustment in the drive condition and the rapidity of guide vane adjustment in the braking and neutral conditions are optimized, wherein said transmission means includes ring means which is rotatable about an axis extending perpendicular to said vane axes and gear means drivingly connecting said ring means and said guide vanes such that predetermined rotational movement of said ring means results in corresponding similar predetermined rotational movement of said guide means for all conditions of said engine.

6. An arrangement according to claim 5, wherein said transmission means includes first and second lever members, said first lever being pivotally connected at one end to said ring means and at the other end to one end of said second lever member, the other end of said second lever being pivotally connected to said piston means, said second lever being pivotally connected to a fulcrum intermediate the ends of said second lever.

7. An arrangement according to claim 6, wherein said first and second lever members are more nearly aligned with one another when said engine is in said drive condition than when said engine is in either of said neutral and braking conditions.

8. An arrangement according to claim 7, wherein said drive condition of said engine ranges from full load to the lowest practicable partial load on said engine, and wherein said first and second lever members are substantially aligned with one another when said engine is in said drive condition at full load.

9. An arrangement according to claim 8, wherein said first and second lever members are maximally angled with respect to one another when said engine is in said braking condition at maximum braking.

10. An arrangement according to claim 8, wherein said engine is a double shaft automobile driving gas turbine engine.

11. An arrangement according to claim 9, wherein said engine is a double shaft automobile driving gas turbine engine.

12. An arrangement according to claim 5, wherein said ring means is a toothed ring extending around the outer ends of said guide vanes, and wherein said gear means include beveled gear means.

13. An arrangement according to claim 9, wherein said ring means is a toothed ring extending around the outer ends of said guide vanes, and wherein said gear means include beveled gear means.

14. An arrangement according to claim 6, wherein said first lever engages the ring means substantially tangentially so as to reduce transverse forces.

15. An arrangement according to claim 9, wherein said first lever engages the ring means substantially tangentially so as to reduce transverse forces.

16. An arrangement according to claim 3, wherein said rotational movement of said guide vanes is a parabolic function of the linear movement of said piston means.

17. An arrangement according to claim 9, wherein said rotational movement of said guide vanes is a parabolic function of the linear movement of said piston means.

* * * * *